(12) United States Patent
Egawa et al.

(10) Patent No.: US 12,533,635 B2
(45) Date of Patent: Jan. 27, 2026

(54) ELECTRODIALYSIS DEVICE

(71) Applicant: MITSUBISHI HEAVY INDUSTRIES, LTD., Tokyo (JP)

(72) Inventors: Kaoru Egawa, Tokyo (JP); Yoshiaki Ito, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 39 days.

(21) Appl. No.: 18/835,935

(22) PCT Filed: Oct. 19, 2022

(86) PCT No.: PCT/JP2022/038852
§ 371 (c)(1),
(2) Date: Aug. 5, 2024

(87) PCT Pub. No.: WO2023/153023
PCT Pub. Date: Aug. 17, 2023

(65) Prior Publication Data
US 2025/0153105 A1 May 15, 2025

(30) Foreign Application Priority Data
Feb. 9, 2022 (JP) .................. 2022-018375

(51) Int. Cl.
*B01D 61/46* (2006.01)
*B01D 61/02* (2006.01)
(Continued)

(52) U.S. Cl.
CPC ......... *B01D 61/46* (2013.01); *B01D 61/0271* (2022.08); *B01D 61/12* (2013.01);
(Continued)

(58) Field of Classification Search
CPC .... B01D 61/46; B01D 61/0271; B01D 61/12; B01D 61/54; B01D 2313/18;
(Continued)

(56) References Cited

U.S. PATENT DOCUMENTS

| 11,820,689 B2* | 11/2023 | Ganzi ........................ C02F 9/00 |
| 2005/0103717 A1* | 5/2005 | Jha ........................ B01D 61/48 |
| | | 210/243 |

(Continued)

FOREIGN PATENT DOCUMENTS

| CN | 107398181 A | 11/2017 |
| JP | 2001-129554 A | 5/2001 |

(Continued)

OTHER PUBLICATIONS

Ge et al., "Electrodialysis with nanofiltration membrane (EDNF) for high-efficiency cations fractionation," Journal of Membrane Science, vol. 498, 2016, pp. 192-200.

(Continued)

*Primary Examiner* — Bryan D. Ripa
(74) *Attorney, Agent, or Firm* — Birch, Stewart, Kolasch & Birch, LLP

(57) ABSTRACT

This electrodialysis device comprises: an electrodialyzer stack having a cathode, an anode, and a membrane unit including at least three membranes provided at intervals between the cathode and the anode, wherein a dilution chamber and a concentration chamber is formed between adjacent membranes; a liquid-to-be-treated feed device that causes a liquid to be treated to flow through the dilution chamber to obtain a diluted liquid; a concentrate liquid circulation device for causing a concentrate liquid to be concentrated to circulate through the concentration chamber, a circulation line through which the concentrate liquid flows to return to the concentration chamber after flowing out from (Continued)

the concentration chamber; a drainage line through which the diluted liquid flowing out from the dilution chamber flows; a concentrated solution line for extracting a part of the concentrate liquid circulating through the circulation line from the circulation line; and a narrowing member provided on the circulation line between the branch point at which the concentrated solution line branches from the circulation line and the outlet of the concentration chamber, and which narrows the flow of the concentrate liquid, and/or a narrowing member provided on the drainage line and which narrows the flow of the diluted liquid.

2 Claims, 7 Drawing Sheets

(51) Int. Cl.
*B01D 61/12* (2006.01)
*B01D 61/54* (2006.01)

(52) U.S. Cl.
CPC .......... *B01D 61/54* (2013.01); *B01D 2313/18* (2013.01); *B01D 2313/903* (2022.08)

(58) Field of Classification Search
CPC .......... B01D 2313/903; B01D 2313/60; B01D 61/027; B01D 61/58; B01D 61/44; C02F 1/469; Y02A 20/124
See application file for complete search history.

(56) References Cited

U.S. PATENT DOCUMENTS

| | | | |
|---|---|---|---|
| 2008/0017513 A1* | 1/2008 | Bazinet | B01D 61/425 |
| | | | 204/532 |
| 2011/0120886 A1 | 5/2011 | Jha et al. | |
| 2018/0318767 A1* | 11/2018 | Roitel | B01D 61/58 |
| 2023/0075109 A1* | 3/2023 | Montanari | C02F 1/4695 |

FOREIGN PATENT DOCUMENTS

| | | |
|---|---|---|
| JP | 2001-269668 A | 10/2001 |
| JP | 2007-513748 A | 5/2007 |
| JP | 2012-40474 A | 3/2012 |
| JP | 2013-63372 A | 4/2013 |

OTHER PUBLICATIONS

International Preliminary Report on Patentability and Written Opinion of the International Searching Authority for International Application No. PCT/JP2022/038852, dated Aug. 22, 2024, with an English translation.

* cited by examiner

ELECTRODIALYSIS DEVICE

TECHNICAL FIELD

The present disclosure relates to an electrodialysis device.

The present application claims priority based on Japanese Patent Application No. 2022-18375 filed in Japan on Feb. 9, 2022, the contents of which are incorporated herein by reference.

BACKGROUND ART

PTL 1 and NPL 1 disclose an electrodialysis device having a stack configuration in which either a cation exchange membrane or an anion exchange membrane is replaced with a nanofiltration membrane, that is, an electrodialysis device with a nanofiltration membrane incorporated (EDNF).

CITATION LIST

Patent Literature

[PTL 1] Chinese Unexamined Patent Application Publication No. 107398181

Non Patent Literature

[NPL 1] L. Geetal et al., "Electrodialysis with nanofiltration membrane (EDNF) for high-efficiency cations fractionation", Journal of Membrane Science, 498, pp. 192 to 200 (2016)

SUMMARY OF INVENTION

Technical Problem

Since the nanofiltration membrane is cheaper than an ion exchange membrane, the EDNF has an advantage such as reduced membrane costs and reduced membrane replacement expenses during maintenance as compared with a normal electrodialysis device. However, since an amount of movement of water caused by ion movement through the nanofiltration membrane increases, there is a problem of higher operating costs in a case of dialyzing a liquid with a high solute concentration. Meanwhile, in a case where there is a concern of scale precipitation from a liquid having an increased solute concentration due to the ion movement through the nanofiltration membrane, there is also a need to promote the movement of water caused by the ion movement through the nanofiltration membrane in order to suppress the scale precipitation.

In view of the above-described circumstances, an object of at least one embodiment of the present disclosure is to regulate an amount of movement of water through a nanofiltration membrane in an electrodialysis device with a nanofiltration membrane incorporated.

Solution to Problem

In order to achieve the above-described object, according to the present disclosure, there is provided an electrodialysis device including: an electrodialyzer stack that includes a cathode, an anode, and a membrane unit including at least three membranes provided at intervals between the cathode and the anode, the electrodialyzer stack including at least one dilution chamber and at least one concentration chamber formed between adjacent membranes, in which the membrane unit includes at least two ion exchange membranes that include two ion exchange membranes which are either anion exchange membranes or cation exchange membranes and which are respectively adjacent to the cathode and the anode, and at least one nanofiltration membrane, the at least two ion exchange membranes and the at least one nanofiltration membrane being provided alternately with each other, or includes at least two nanofiltration membranes that include two nanofiltration membranes respectively adjacent to the cathode and the anode, and at least one ion exchange membrane that is either an anion exchange membrane or a cation exchange membrane, the at least two nanofiltration membranes and the at least one ion exchange membrane being provided alternately with each other, and the electrodialysis device further includes: a treated solution feed device that causes a treated solution to flow through the at least one dilution chamber to obtain a diluted liquid; a concentrated solution circulation device for causing a concentrated solution to be concentrated to circulate through the at least one concentration chamber; a circulation line through which the concentrated solution flows to return to the at least one concentration chamber after flowing out from the at least one concentration chamber; a concentrated solution line for extracting a part of the concentrated solution circulating through the circulation line from the circulation line; a discharge line through which the diluted liquid flowing out from the at least one dilution chamber flows; and at least one of a throttle member that is provided in the circulation line between a branching point where the concentrated solution line branches from the circulation line and an outlet of the at least one concentration chamber and that throttles a flow of the concentrated solution, or a throttle member that is provided in the discharge line and that throttles a flow of the diluted liquid.

Advantageous Effects of Invention

With the electrodialysis device of the present disclosure, the throttle member throttles the flow of the concentrated solution to increase a pressure in the concentration chamber, so that a driving force to move water from the concentration chamber to the dilution chamber is generated, and a driving force to move water from the dilution chamber to the concentration chamber is partially offset by a potential difference. As a result, the amount of movement of water caused by ion movement from the dilution chamber to the concentration chamber can be reduced. In addition, the throttle member throttles the flow of the diluted liquid to increase a pressure in the dilution chamber, so that a driving force to move water from the dilution chamber to the concentration chamber is increased. As a result, the amount of movement of water caused by ion movement from the dilution chamber to the concentration chamber can be increased.

DESCRIPTION OF EMBODIMENTS

Hereinafter, an electrodialysis device according to an embodiment of the present disclosure will be described with reference to the drawings. The embodiment to be described below shows an aspect of the present disclosure, does not limit this disclosure, and can be freely changed within the scope of the technical idea of the present disclosure.

Embodiment 1

<Configuration of Electrodialysis Device According to Embodiment 1 of Present Disclosure>

Figure 1:
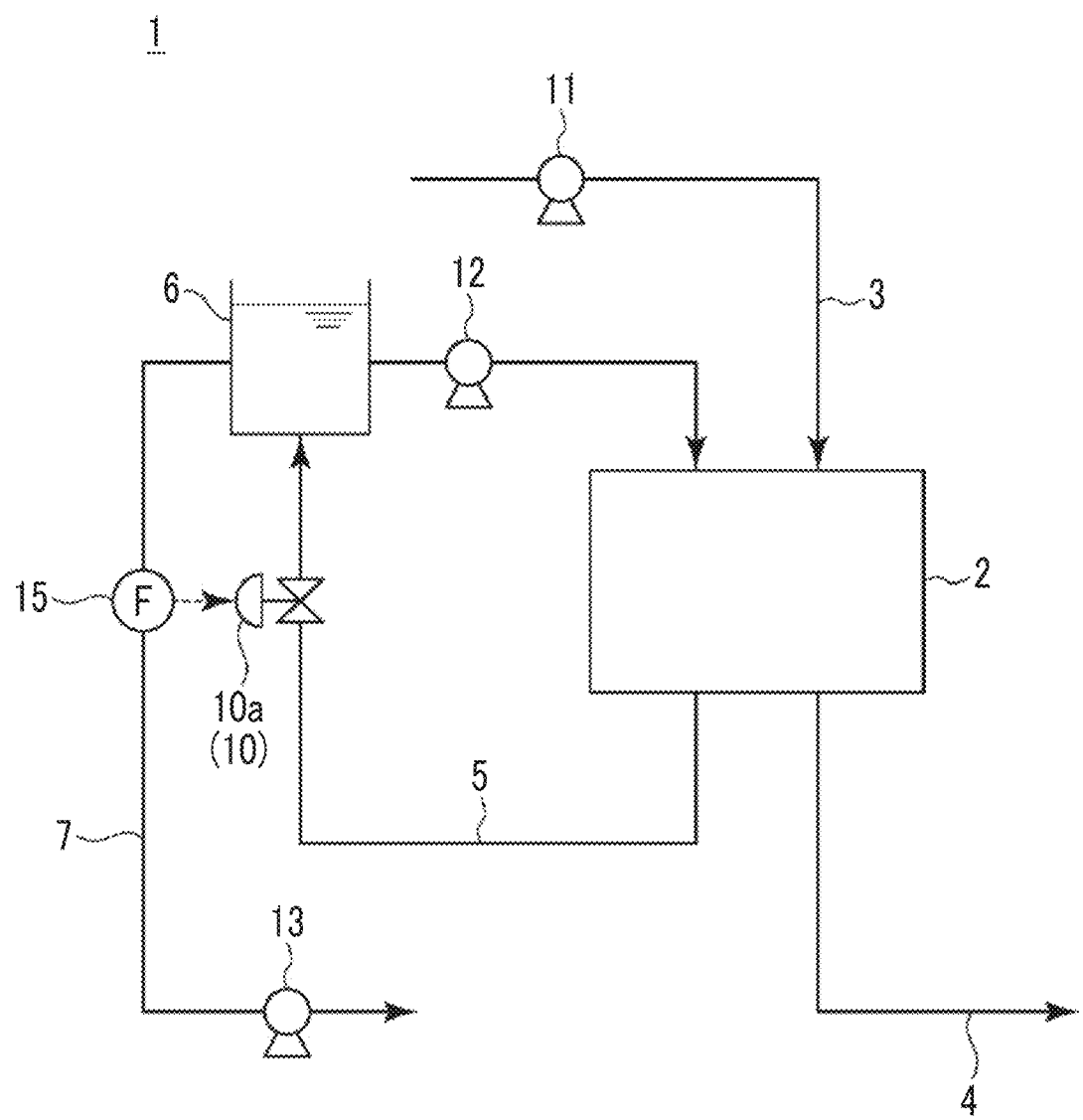
FIG. 1 is a schematic configuration diagram of an electrodialysis device according to Embodiment 1 of the present disclosure.

As shown in FIG. 1, an electrodialysis device 1 according to Embodiment 1 of the present disclosure includes an electrodialyzer stack 2 for separating a treated solution in which an ionic solute is dissolved into a diluted liquid and a concentrated solution. A treated solution feed line 3 for feeding the treated solution to the electrodialyzer stack 2 and a discharge line 4 for discharging the diluted liquid obtained by electrodialysis using the electrodialyzer stack 2 from the electrodialyzer stack 2 are connected to the electrodialyzer stack 2. In addition, a circulation line 5 through which the concentrated solution obtained by electrodialysis using the electrodialyzer stack 2 flows to return to the electrodialyzer stack 2 after flowing out from the electrodialyzer stack 2 is connected to the electrodialyzer stack 2. The circulation line 5 may be provided with a concentrated solution tank 6 that stores a part of the concentrated solution. A concentrated solution line 7 for extracting a part of the concentrated solution circulating through the circulation line 5 from the circulation line 5 is connected to the circulation line 5. In Embodiment 1, as an example, the concentrated solution tank 6 is provided in the circulation line 5, and the concentrated solution line 7 is configured to branch from the circulation line 5 at the concentrated solution tank 6.

The treated solution feed line 3 is provided with a feed pump 11 which is a treated solution feed device for feeding the treated solution to the electrodialyzer stack 2, the circulation line 5 is provided with a circulation pump 12 which is a concentrated solution circulation device for circulating the concentrated solution, and the concentrated solution line 7 is provided with an extraction pump 13 for extracting a part of the concentrated solution circulating through the circulation line 5 from the circulation line 5. In the circulation line 5, a throttle member 10 that throttles the flow of the concentrated solution is provided between a branching point (corresponding to the concentrated solution tank 6 in Embodiment 1) where the concentrated solution line 7 branches from the circulation line 5 and an outlet of the electrodialyzer stack 2. The throttle member 10 may be, for example, a flow regulation valve, an orifice, or the like.

In a case where the throttle member 10 is a flow regulation valve 10a, the flow rate of the concentrated solution extracted from the circulation line 5 can be regulated. For this purpose, a flow meter 15 may be provided in the concentrated solution line 7, and an opening degree of the flow regulation valve 10a may be configured to be controlled such that the flow rate of the concentrated solution extracted from the circulation line 5 is a set value set in advance.

<Configuration of Electrodialyzer Stack Provided in Electrodialysis Device According to Embodiment 1 of Present Disclosure>

Figure 2:
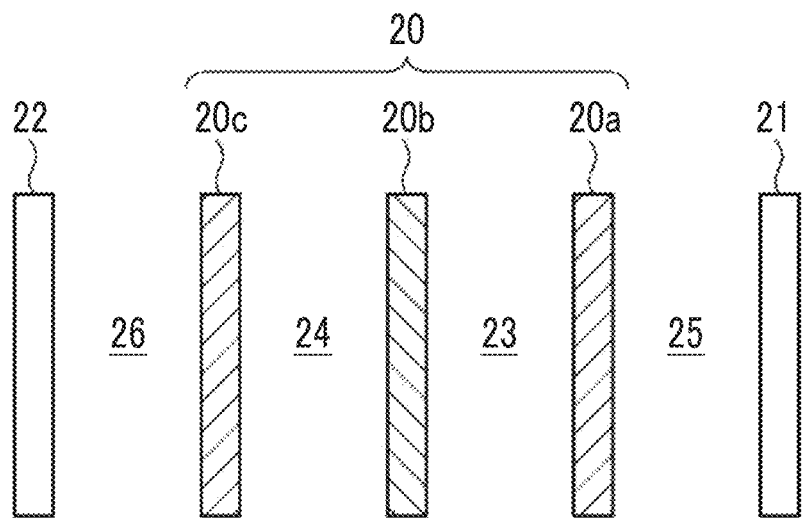
FIG. 2 is a schematic configuration diagram of an electrodialyzer stack provided in the electrodialysis device according to Embodiment 1 of the present disclosure.

FIG. 2 shows an example of a configuration of the electrodialyzer stack 2. The electrodialyzer stack 2 includes a cathode 21, an anode 22, and a membrane unit 20 including three membranes 20a, 20b, and 20c provided at intervals between the cathode 21 and the anode 22. The three membranes 20a, 20b, and 20c are each any of a nanofiltration membrane or an ion exchange membrane, which is either an anion exchange membrane or a cation exchange membrane, and are configured such that the ion exchange membrane and the nanofiltration membrane are provided alternately with each other.

For example, in a case where the membranes 20a and 20c respectively adjacent to the cathode 21 and the anode 22 are the cation exchange membranes, and the membrane 20b is the nanofiltration membrane, a chamber 23 formed between the membrane 20a and the membrane 20b is the dilution chamber through which the treated solution flows, and a chamber 24 formed between the membrane 20b and the membrane 20c is the concentration chamber through which the concentrated solution flows. That is, the treated solution feed line 3 and the discharge line 4 are connected to the inlet and the outlet of the chamber 23 (dilution chamber), respectively, and one end and the other end of the circulation line 5 (refer to FIG. 1) are connected to the inlet and the outlet of the chamber 24 (concentration chamber), respectively.

For example, in a case where the membranes 20a and 20c respectively adjacent to the cathode 21 and the anode 22 are the anion exchange membranes, and the membrane 20b is a nanofiltration membrane, the chamber 23 formed between the membrane 20a and the membrane 20b is the concentration chamber through which the concentrated solution flows, and the chamber 24 formed between the membrane 20b and the membrane 20c is the dilution chamber through which the treated solution flows. That is, one end and the other end of the circulation line 5 (refer to FIG. 1) are connected to the inlet and the outlet of the chamber 23 (concentration chamber), respectively, and the treated solution feed line 3 and the discharge line 4 are connected to the inlet and the outlet of the chamber 24 (dilution chamber), respectively.

For example, in a case where the membranes 20a and 20c respectively adjacent to the cathode 21 and the anode 22 are the nanofiltration membranes, and the membrane 20b is the cation exchange membrane, the chamber 23 formed between the membrane 20a and the membrane 20b is the concentration chamber through which the concentrated solution flows, and the chamber 24 formed between the membrane 20b and the membrane 20c is the dilution chamber through which the treated solution flows. That is, one end and the other end of the circulation line 5 (refer to FIG. 1) are connected to the inlet and the outlet of the chamber 23 (concentration chamber), respectively, and the treated solution feed line 3 and the discharge line 4 are connected to the inlet and the outlet of the chamber 24 (dilution chamber), respectively.

For example, in a case where the membranes 20a and 20c respectively adjacent to the cathode 21 and the anode 22 are the nanofiltration membranes, and the membrane 20b is the anion exchange membrane, the chamber 23 formed between the membrane 20a and the membrane 20b is the dilution chamber through which the treated solution flows, and the chamber 24 formed between the membrane 20b and the membrane 20c is the concentration chamber through which the concentrated solution flows. That is, the treated solution feed line 3 and the discharge line 4 are connected to the inlet and the outlet of the chamber 23 (dilution chamber), respectively, and one end and the other end of the circulation line 5 (refer to FIG. 1) are connected to the inlet and the outlet of the chamber 24 (concentration chamber), respectively.

The configuration of the membrane unit 20 is not limited to the configuration including the three membranes 20a, 20b, and 20c, and the membrane 20b may include three or more odd-numbered membranes in a case where the membranes 20a and 20c respectively adjacent to the cathode 21 and the anode 22 are either the ion exchange membranes or the nanofiltration membranes, respectively. However, in a case where the membrane 20b includes three or more odd-numbered membranes, it is necessary that the ion exchange membrane and the nanofiltration membrane are provided alternately with each other between the cathode 21 and the anode 22. In this case, at least one of the dilution chamber or the concentration chamber is formed by two or more.

An electrode chamber 25 formed between the cathode 21 and the membrane 20a and an electrode chamber 26 formed between the anode 22 and the membrane 20c are each configured to allow an electrode liquid (for example, seawater) to flow therethrough.

<Operation of Electrodialysis Device According to Embodiment 1 of Present Disclosure>

Next, an operation of the electrodialysis device 1 according to Embodiment 1 of the present disclosure will be described. As shown in FIG. 1, by activating the feed pump 11, the treated solution flows through the treated solution feed line 3 and flows into the electrodialyzer stack 2. By activating the circulation pump 12, the concentrated solution circulates through the circulation line 5. In the electrodialyzer stack 2, by moving an ionic solute that is dissolved in the treated solution to the concentrated solution through an operation to be described below, the treated solution is diluted and flows out from the electrodialyzer stack 2 as the diluted liquid to flow through the discharge line 4.

Since a part of the water of the treated solution also moves to the concentrated solution in a case where the treated solution is separated into the diluted liquid and the concentrated solution in the electrodialyzer stack 2, the flow rate of the concentrated solution circulating through the circulation line 5 is increased. By throttling the flow of the concentrated solution circulating through the circulation line 5 by using the throttle member 10, a part of the concentrated solution can be extracted from the circulation line 5 to the concentrated solution line 7, and a part of the concentrated solution can be discharged. In a case where the throttle member 10 is the flow regulation valve 10a, by regulating the opening degree of the flow regulation valve 10a based on a detected value of the flow meter 15, it is possible to regulate an extraction flow rate of the concentrated solution to a desired value.

Figure 3:
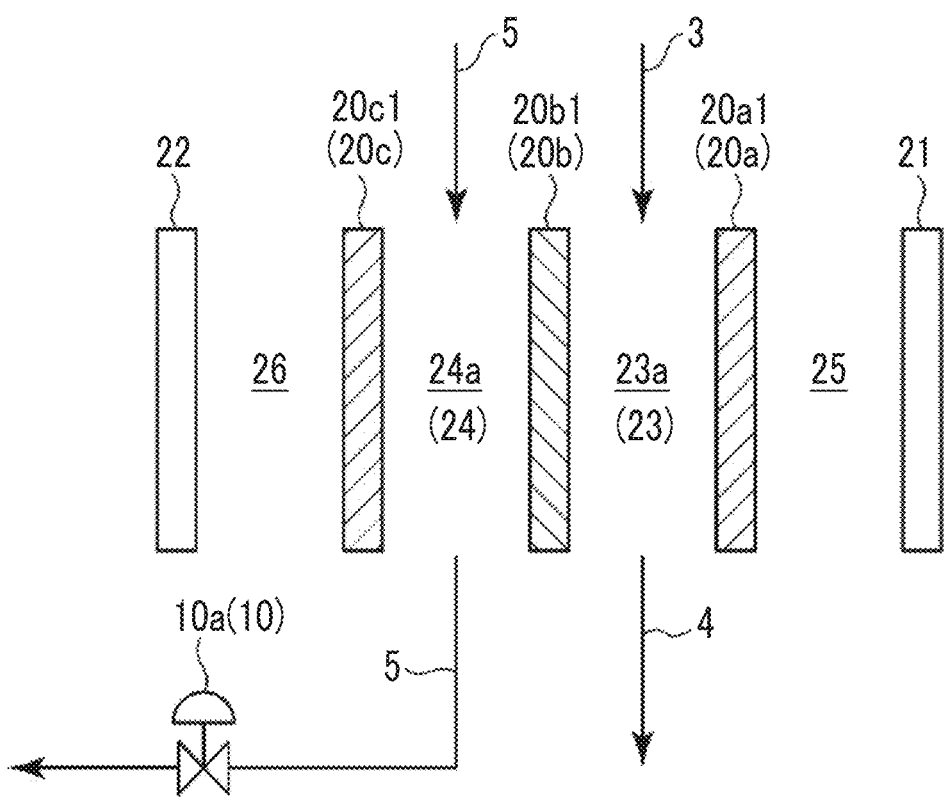
FIG. 3 is a diagram showing an example of a specific configuration of the electrodialyzer stack provided in the electrodialysis device according to Embodiment 1 of the present disclosure.

Next, as shown in FIG. 3, a case where the membranes 20a and 20c are cation exchange membranes 20a1 and 20c1, respectively, the membrane 20b is a nanofiltration membrane 20b1, and the treated solution is seawater will be described as an example of the operation of electrodialysis in the electrodialyzer stack 2. In this case, the chamber 23 is a dilution chamber 23a, and the chamber 24 is a concentration chamber 24a.

The seawater flowing into the electrodialyzer stack 2 through the treated solution feed line 3 flows into the dilution chamber 23a. When the concentrated solution circulating through the circulation line 5 flows into the electrodialyzer stack 2, the concentrated solution flows into the concentration chamber 24a. When a current is applied between the cathode 21 and the anode 22, sodium ions in the seawater in the dilution chamber 23a are attracted toward the cathode 21 and flow into the electrode chamber 25 through the cation exchange membrane 20a1. In addition, the sodium ions in the electrode liquid (seawater) in the electrode chamber 26 are also attracted toward the cathode 21 and flow into the concentration chamber 24a through the cation exchange membrane 20c1. Chloride ions in the seawater in the dilution chamber 23a are attracted toward the anode 22 and flow into the concentration chamber 24a through the nanofiltration membrane 20b1. Consequently, the concentration of sodium chloride in the seawater in the dilution chamber 23a is reduced. That is, the seawater is desalinated. On the other hand, the concentration of sodium chloride in the concentrated solution in the concentration chamber 24a is increased because of the sodium ions flowing in from the electrode chamber 26 and the chloride ions flowing in from the dilution chamber 23a.

During the above-described operation of the electrodialysis, as the chloride ions pass through the nanofiltration membrane 20b1, the water flows into the concentration chamber 24a from the dilution chamber 23a through the nanofiltration membrane 20b1. In Embodiment 1, the flow of the concentrated solution flowing out from the concentration chamber 24a is throttled by the throttle member 10. By doing so, the pressure in the concentration chamber 24a increases, a driving force to move the water from the concentration chamber 24a to the dilution chamber 23a is generated, and a driving force to move the water from the dilution chamber to the concentration chamber is partially offset by the potential difference. As a result, the amount of movement of the water caused by the ion movement from the dilution chamber 23a to the concentration chamber 24a can be reduced. In a case where the throttle member 10 is the flow regulation valve 10a, a difference in the pressure between the dilution chamber 23a and the concentration chamber 24a through the nanofiltration membrane 20b1 can be appropriately controlled, so that the amount of movement of the water caused by the ion movement from the dilution chamber 23a to the concentration chamber 24a can be appropriately reduced.

Since those skilled in the art can understand, with reference to the above-described operation, the operation of the electrodialysis and the principle of reducing the amount of movement of the water caused by the ion movement from the dilution chamber 23a to the concentration chamber 24a, in any of a case where the membranes 20a and 20c are the anion exchange membranes, a case where the membranes 20a and 20c are the nanofiltration membranes and the membrane 20b is the ion exchange membrane, and a case where the membrane 20b includes three or more odd-numbered membranes, the detailed descriptions for those cases will be omitted.

Modification Example of Electrodialysis Device According to Embodiment 1 of Present Disclosure In Embodiment 1, only the concentrated solution is circulated, but the diluted liquid may be circulated such that the diluted liquid flowing out from the dilution chamber 23a is fed to the diluted liquid together with the treated solution. In this case, the same members as the concentrated solution tank 6 and the concentrated solution line 7 can be provided in the circulation line of the diluted liquid.

Embodiment 2

Next, an electrodialysis device according to Embodiment 2 of the present disclosure will be described. The electrodialysis device according to Embodiment 2 is configured to promote the amount of movement of water from the dilution chamber 23a to the concentration chamber 24a, relative to Embodiment 1. In Embodiment 2, the same components as those in Embodiment 1 are designated by the same reference numerals, and a detailed description thereof will be omitted.

Figure 4:
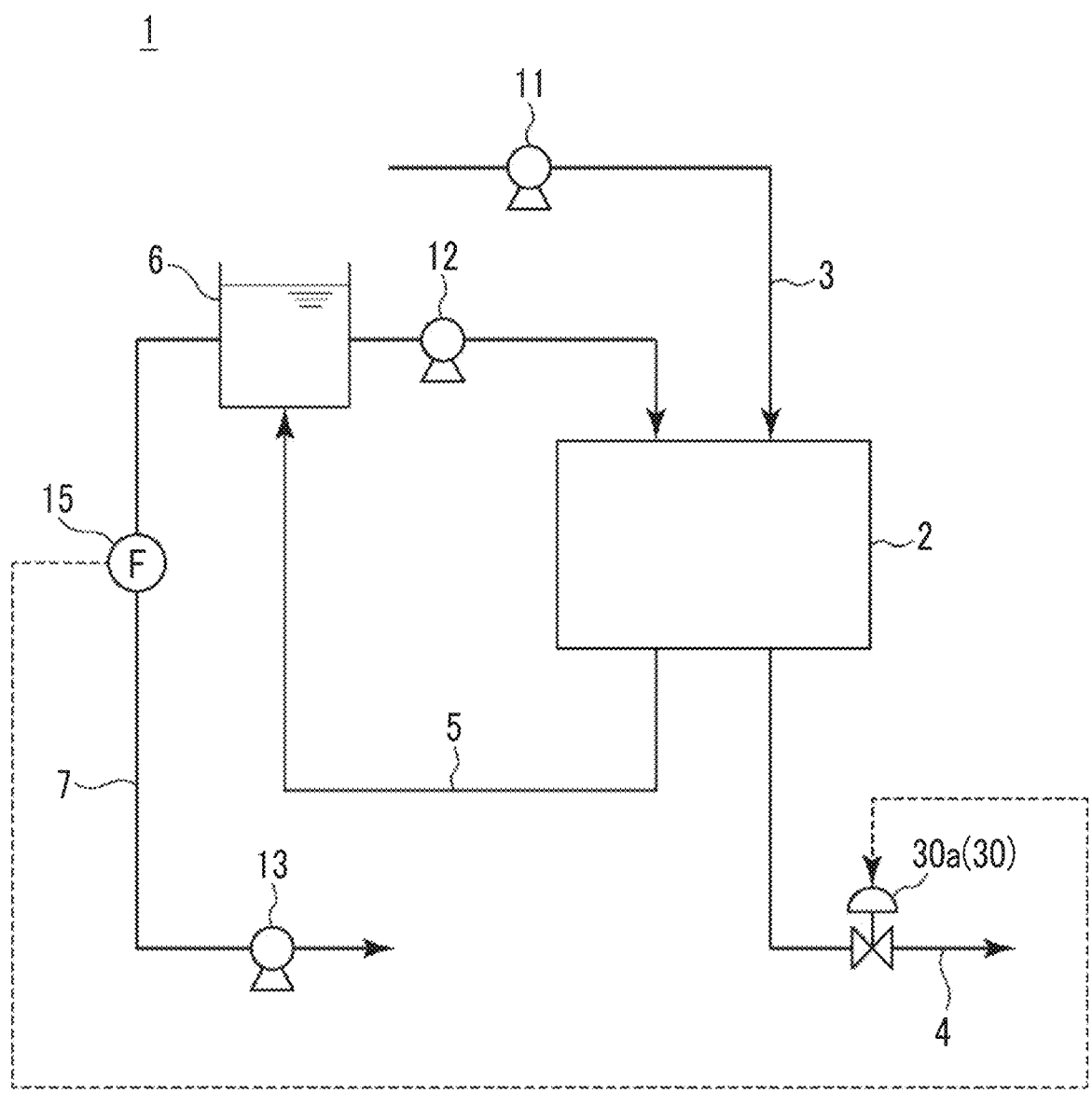
FIG. 4 is a schematic configuration diagram of an electrodialysis device according to Embodiment 2 of the present disclosure.

Configuration of Electrodialysis Device According to Embodiment 2 of Present Disclosure As shown in FIG. 4, in the electrodialysis device 1 according to Embodiment 2 of the present disclosure, a throttle member 30 that throttles the flow of the diluted liquid is provided in the discharge line 4. The throttle member 30 may be, for example, a flow regulation valve, an orifice, or the like. In a case where the throttle member 30 is a flow regulation valve 30a, by regulating the amount of movement of the water from the dilution chamber 23a to the concentration chamber 24a through an operation to be described below, it is possible to regulate the flow rate of the concentrated solution extracted from the circulation line 5. For this purpose, the flow meter 15 may be provided in the concentrated solution line 7, and an opening degree of the flow regulation valve 30a may be configured to be controlled such that the flow rate of the concentrated solution extracted from the circulation line 5 is a set value set in advance. Other configurations are the same as those of Embodiment 1 except that the throttle member 10 is not provided in the circulation line 5 (refer to FIG. 1). However, the throttle member 10 may be provided in the circulation line 5 in order to enable the operation described in Embodiment 1 separately from the operation of Embodiment 2 to be described below.

Operation of Electrodialysis Device According to Embodiment 2 of Present Disclosure In the electrodialysis device 1, in a case where the solute concentration of the concentrated solution is high, there is a concern of scale precipitation (for example, gypsum scale precipitation in a case where the treated solution is seawater). In such a case, in Embodiment 2, in a case where the pressure in the dilution chamber 23a (refer to FIG. 3) is increased by regulating the opening degree of the flow regulation valve 30a, the movement of the water from the dilution chamber 23a to the concentration chamber 24a (refer to FIG. 3) is promoted, so that the flow rate of the concentrated solution can be increased. Therefore, the scale precipitation can be suppressed. In a case where it is known that a certain degree of throttle needs to be applied to the diluted liquid even when the throttle member 30 cannot regulate the degree of throttle of the diluted liquid as in the orifice or the like, it is possible to obtain the same effect as in a case where the flow regulation valve 30a is provided.

Embodiment 3

Next, an electrodialysis device according to Embodiment 3 of the present disclosure will be described. The electrodialysis device according to Embodiment 3 is configured to promote the amount of movement of the water through the nanofiltration membrane according to the nature of the treated solution, relative to Embodiment 2. In Embodiment 3, the same components as those in Embodiment 2 are designated by the same reference numerals, and a detailed description thereof will be omitted.

Figure 5:
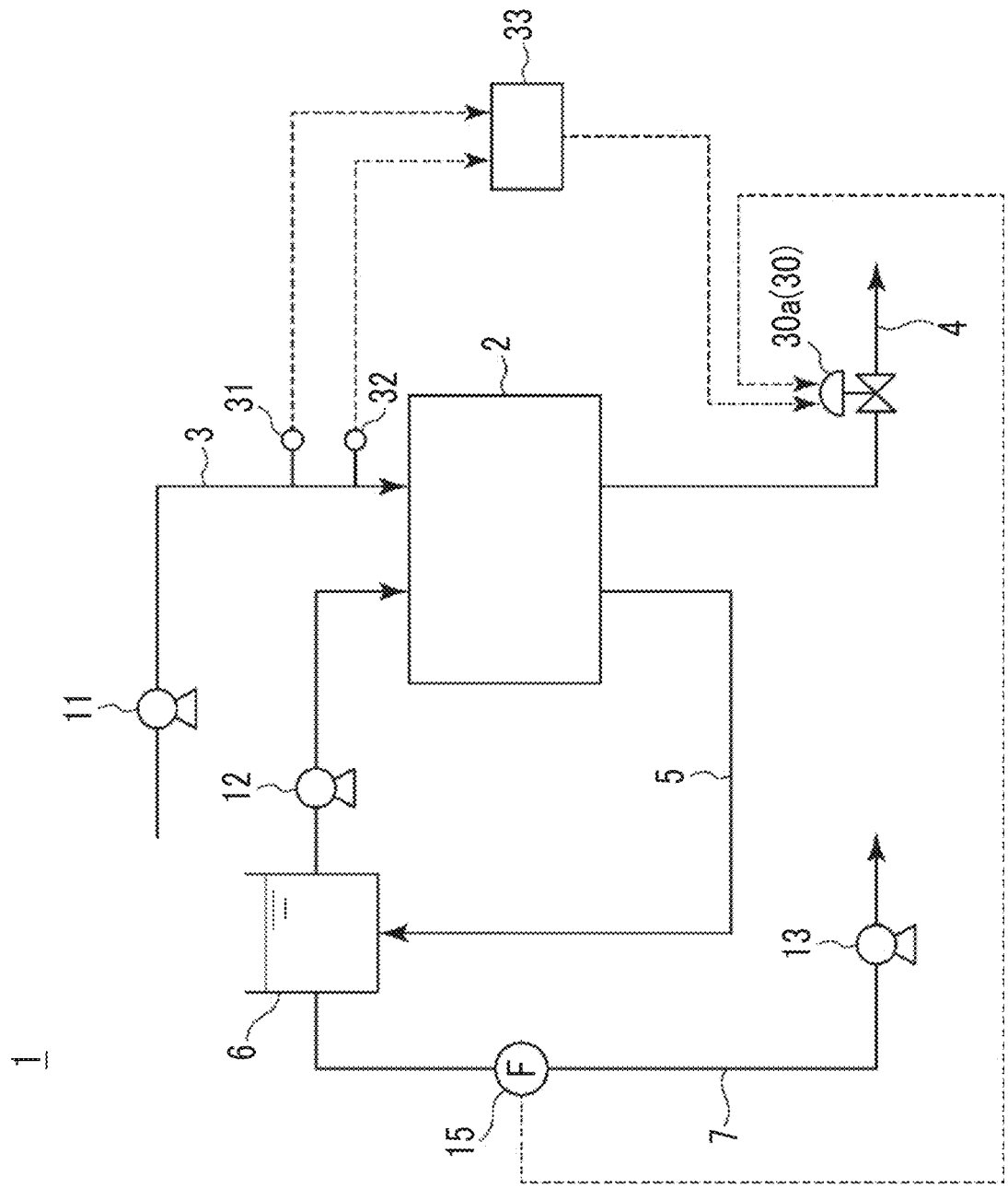
FIG. 5 is a schematic configuration diagram of an electrodialysis device according to Embodiment 3 of the present disclosure.

Configuration of Electrodialysis Device According to Embodiment 3 of Present Disclosure As shown in FIG. 5, in the electrodialysis device 1 according to Embodiment 3 of the present disclosure, at least one of a temperature sensor 31 that detects a temperature of the treated solution flowing through the treated solution feed line 3 or an electric conductivity meter 32 that detects an electric conductivity of the treated solution flowing through the treated solution feed line 3 is provided in the treated solution feed line 3. The flow regulation valve 30a, the temperature sensor 31, and the electric conductivity meter 32 are each electrically connected to a control device 33, and the control device 33 is configured to control the opening degree of the flow regulation valve 30a through an operation to be described below based on a detected value by at least one of the temperature sensor 31 or the electric conductivity meter 32. The control device 33 is configured with, for example, a central processing unit (CPU), a random access memory (RAM), a read only memory (ROM), a computer-readable storage medium, and the like, and the CPU reads a program stored in the storage medium or the like into the RAM or the like to execute information processing and calculation, thereby implementing the opening degree control of the flow regulation valve 30a. Other configurations are the same as those in Embodiment 2.

Figure 6:
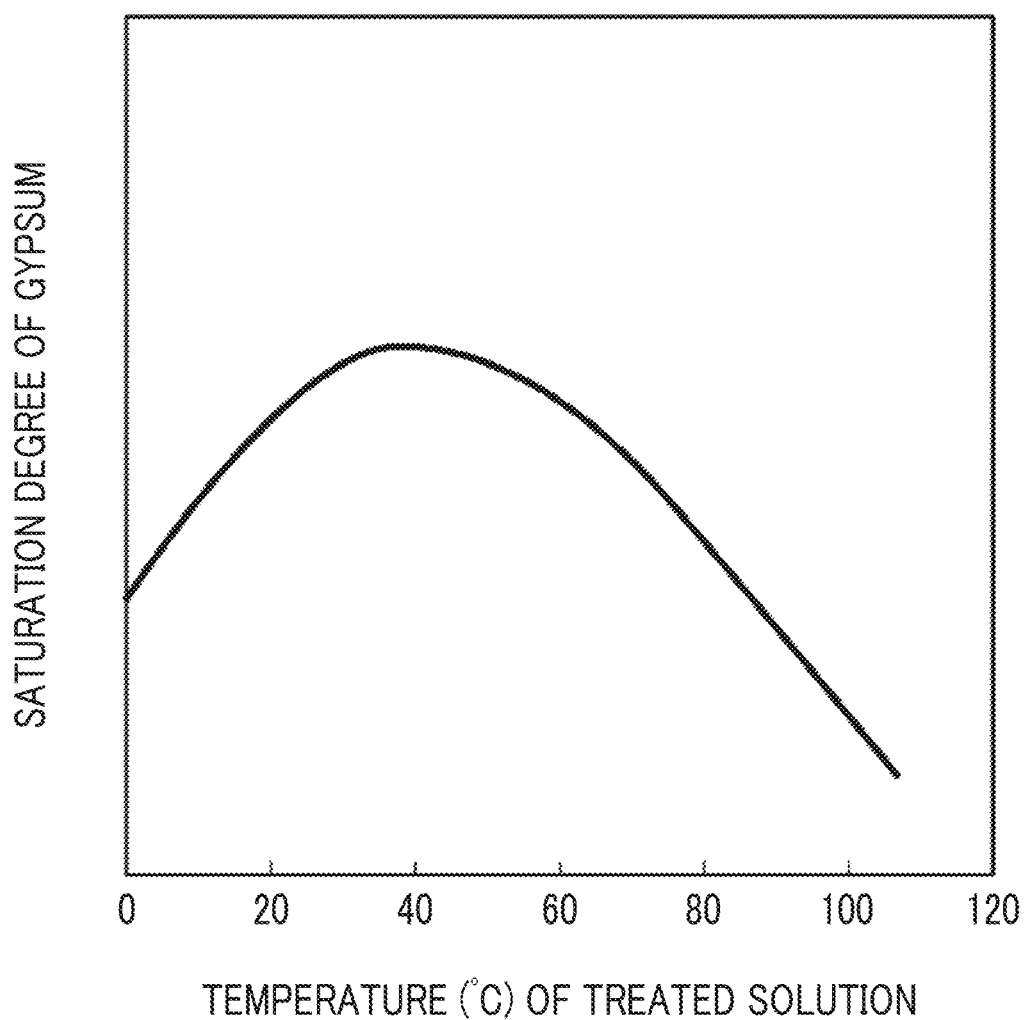
FIG. 6 is a schematic graph showing temperature dependence of a saturation degree of gypsum.

Operation of Electrodialysis Device According to Embodiment 3 of Present Disclosure First, an operation in a case where the temperature sensor 31 is provided will be described. Assuming that the scale of gypsum is precipitated in a case where the treated solution is seawater, generally, the saturation degree (solubility product) of gypsum has temperature dependence as schematically shown in FIG. 6, and the higher the temperature is, the higher the saturation degree is in a general temperature range of 0° C. to 40° C. in which electrodialysis is performed. That is, the lower the temperature of the treated solution is, the higher the risk of scale precipitation is.

For this reason, in Embodiment 3, the detected value of the temperature sensor 31 is transmitted to the control device 33 during the electrodialysis, and the control device 33 controls the opening degree of the flow regulation valve 30a such that the movement of the water from the dilution chamber 23a (refer to FIG. 3) to the concentration chamber 24a (refer to FIG. 3) is promoted as the detected value decreases. Specifically, control is performed to reduce the opening degree of the flow regulation valve 30a as the detected value of the temperature sensor 31 decreases. By reducing the opening degree of the flow regulation valve 30a, the pressure in the dilution chamber 23a is increased due to the throttling of the flow of the discharge line 4, thereby promoting the movement of the water from the dilution chamber 23a to the concentration chamber 24a. As a result, since the solute concentration of the concentrated solution decreases, the risk of scale precipitation can be reduced.

Figure 7:
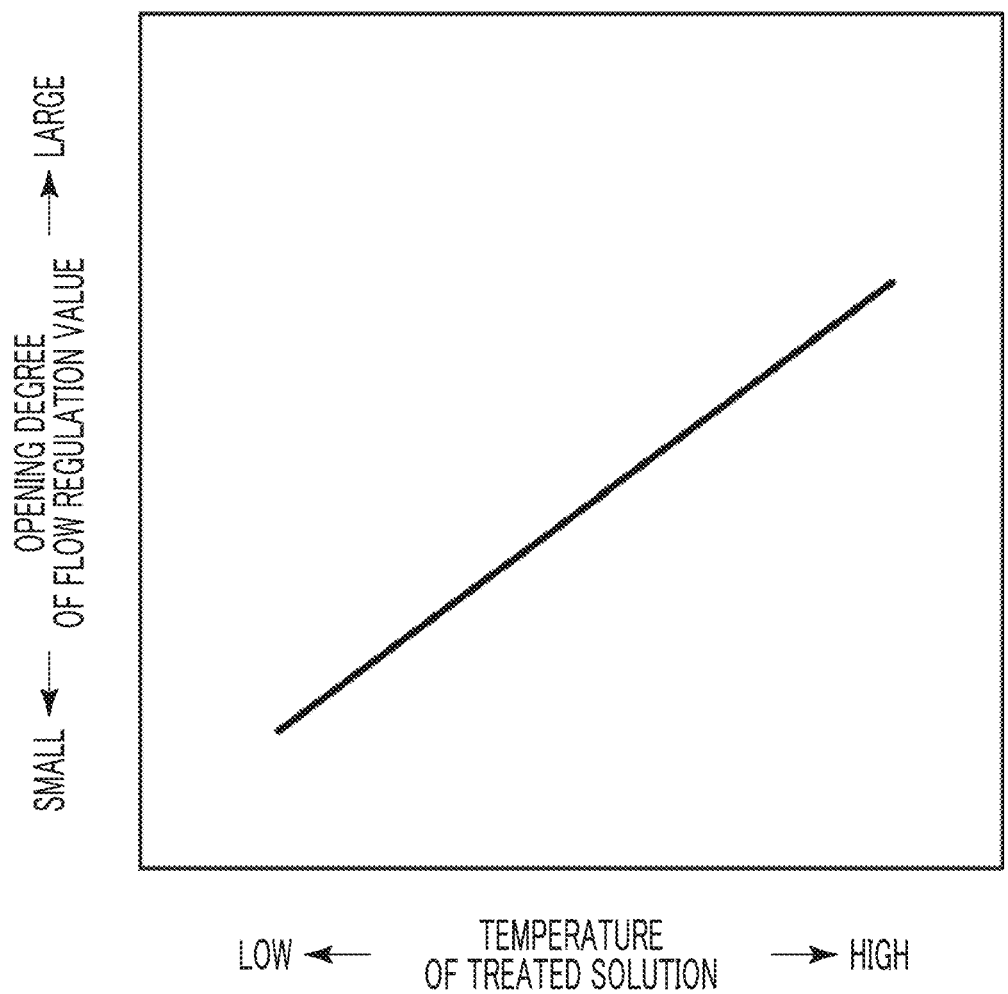
FIG. 7 is a schematic graph showing a relationship between a temperature of a treated solution and an opening degree of a flow regulation valve.

In order for the control device 33 to perform the opening degree control of the flow regulation valve 30a in such a manner, for example, as schematically shown in FIG. 7, the relationship between the temperature of the treated solution and the opening degree of the flow regulation valve 30a is incorporated into the storage medium of the control device 33, or the like, and the control device 33 can determine the opening degree of the flow regulation valve 30a from the detected value of the temperature sensor 31 based on the relationship.

Next, the operation in a case where the electric conductivity meter 32 is provided will be described. As in a case where the temperature sensor 31 is provided, it is assumed that the scale of gypsum is precipitated in a case where the treated solution is seawater. Although the salinity concentration of seawater may vary annually, it is known that the presence ratio of various ions does not change even in a case where the salinity concentration varies. For this reason, the higher the salinity concentration is, the higher the risk of scale precipitation is. The variation in the salinity concentration in the seawater can be monitored by the electric conductivity of the seawater.

Therefore, in Embodiment 3, the detected value of the electric conductivity meter 32 is transmitted to the control device 33 during the electrodialysis, and the control device 33 controls the opening degree of the flow regulation valve 30a such that the movement of the water from the dilution chamber 23a (refer to FIG. 3) to the concentration chamber 24a (refer to FIG. 3) is promoted as the detected value increases. Specifically, control is performed to reduce the opening degree of the flow regulation valve 30a as the detected value of the electric conductivity meter 32 increases. By reducing the opening degree of the flow regulation valve 30a, the pressure in the dilution chamber 23a is increased due to the throttling of the flow of the discharge line 4, thereby promoting the movement of the water from the dilution chamber 23a to the concentration chamber 24a. As a result, since the solute concentration of the concentrated solution decreases, the risk of scale precipitation can be reduced.

Figure 8:
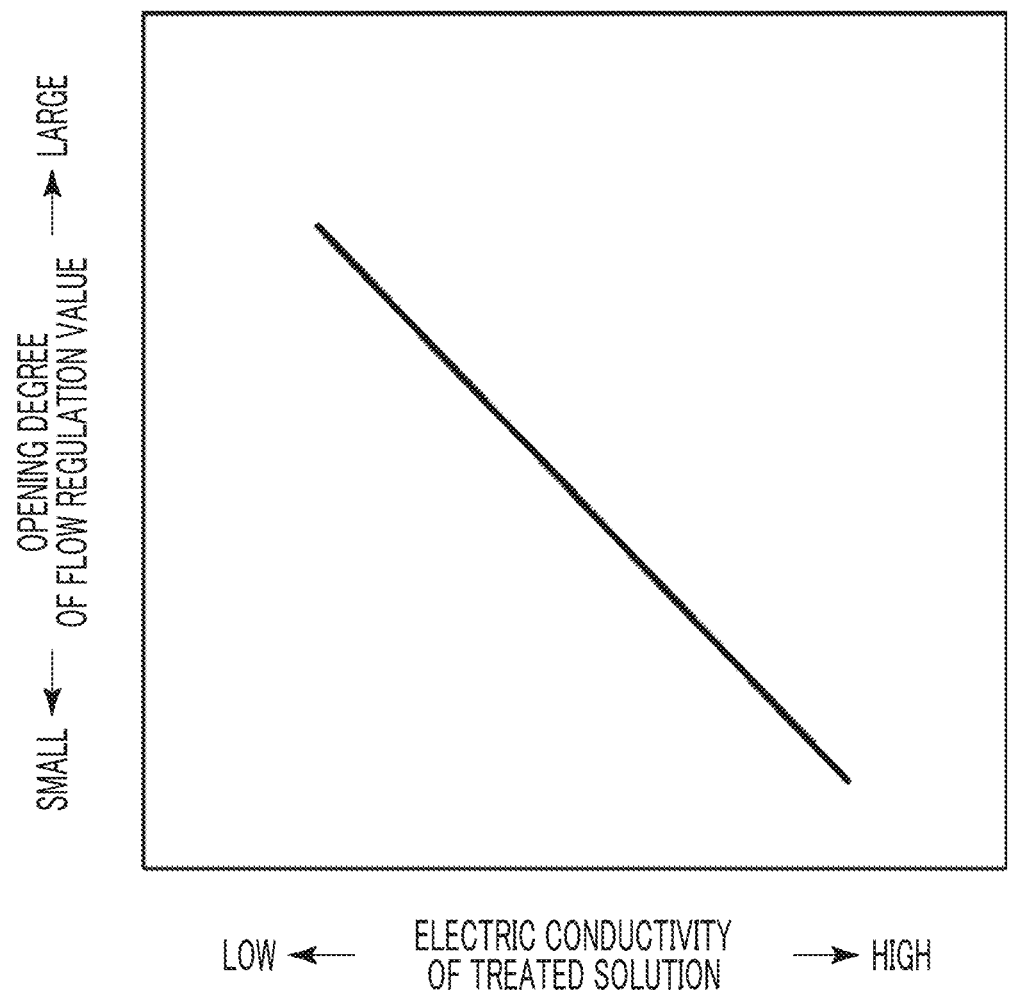
FIG. 8 is a schematic graph showing a relationship between an electric conductivity of the treated solution and the opening degree of the flow regulation valve.

In order for the control device 33 to perform the opening degree control of the flow regulation valve 30a, for example, as schematically shown in FIG. 8, the relationship between the electric conductivity of the treated solution and the opening degree of the flow regulation valve 30a is incorporated into the storage medium of the control device 33, or the like, and the control device 33 can determine the opening degree of the flow regulation valve 30a from the detected value of the electric conductivity meter 32 based on the relationship.

Modification Example of Electrodialysis Device According to Embodiment 3 of Present Disclosure Although the control of the opening degree of the flow regulation valve 30a has been described based on either the temperature or the electric conductivity of the treated solution, the opening degree of the flow regulation valve 30a may be controlled based on both the temperature and the electric conductivity. In addition, in Embodiment 3, the control device 33 controls the opening degree of the flow regulation valve 30a based on at least one of the temperature or the electric conductivity of the treated solution, but the present disclosure is not limited to this embodiment. Even in a case where the control device 33 is not provided, an operator of the electrodialysis device 1 may manually control the opening degree of the flow regulation valve 30a based on at least one of the temperature or the electric conductivity of the treated solution.

The contents described in each of the above-described embodiments are understood as follows, for example.

[1] The electrodialysis device according to one aspect is an electrodialysis device (1) including:

an electrodialyzer stack (2) that includes a cathode (21), an anode (22), and a membrane unit (20) including at least three membranes (20a, 20b, 20c) provided at intervals between the cathode (21) and the anode (22), the electrodialyzer stack (2) including at least one dilution chamber (23a) and at least one concentration chamber (24a) formed between adjacent membranes, in which the membrane unit (20)

includes at least two ion exchange membranes (20a, 20c) that include two ion exchange membranes (20a, 20c) which are either anion exchange membranes or cation exchange membranes and which are respectively adjacent to the cathode (21) and the anode (22), and at least one nanofiltration membrane (20b), the at least two ion exchange membranes (20a, 20c) and the at least one nanofiltration membrane (20b) being provided alternately with each other, or includes at least two nanofiltration membranes (20a, 20c) that include two nanofiltration membranes respectively adjacent to the cathode (21) and the anode (22), and at least one ion exchange membrane (20b) that is either an anion exchange membrane or a cation exchange membrane, the at least two nanofiltration membranes (20a, 20c) and the at least one ion exchange membrane (20b) being provided alternately with each other, and the electrodialysis device (1) further comprises:

a treated solution feed device (feed pump 11) that causes a treated solution to flow through the at least one dilution chamber (23a) to obtain a diluted liquid;

a concentrated solution circulation device (circulation pump 12) for causing a concentrated solution to be concentrated to circulate through the at least one concentration chamber (24a);

a circulation line (5) through which the concentrated solution flows to return to the at least one concentration chamber (24a) after flowing out from the at least one concentration chamber (24a);

a concentrated solution line (7) for extracting a part of the concentrated solution circulating through the circulation line (5) from the circulation line (5);

a discharge line (4) through which the diluted liquid flowing out from the at least one dilution chamber (23a) flows; and at least one of a throttle member (10) that is provided in the circulation line (5) between a branching point (concentrated solution tank 6) where the concentrated solution line (7) branches from the circulation line (5) and an outlet of the at least one concentration chamber (24a) and that throttles a flow of the concentrated solution, or a throttle member (30) that is provided in the discharge line (4) and that throttles a flow of the diluted liquid.

With the electrodialysis device of the present disclosure, the throttle member throttles the flow of the concentrated solution to increase a pressure in the concentration chamber, so that a driving force to move the water from the concentration chamber to the dilution chamber is generated, and a driving force to move the water from the dilution chamber to the concentration chamber is partially offset by a potential difference. As a result, the amount of movement of the water caused by ion movement from the dilution chamber to the concentration chamber can be reduced. In addition, the throttle member throttles the flow of the diluted liquid to increase a pressure in the dilution chamber, so that a driving force to move the water from the dilution chamber to the concentration chamber is increased. As a result, the amount of movement of the water caused by the ion movement from the dilution chamber to the concentration chamber can be increased.

[2] The electrodialysis device according to another aspect is the electrodialysis device of [1],
in which the throttle member (10) that throttles the flow of the concentrated solution is a flow regulation valve (10a) that regulates a flow rate of the concentrated solution flowing through the circulation line (5).

With such a configuration, since the difference in the pressure between the dilution chamber and the concentration chamber through the nanofiltration membrane can be appropriately controlled, the amount of movement of the water caused by the ion movement from the dilution chamber to the concentration chamber can be appropriately reduced.

[3] The electrodialysis device according to still another aspect is the electrodialysis device of [1],
in which the throttle member (30) that throttles the flow of the diluted liquid is a flow regulation valve (30a) that regulates a flow rate of the diluted liquid flowing through the discharge line (4).

With such a configuration, since the difference in the pressure between the dilution chamber and the concentration chamber through the nanofiltration membrane can be appropriately controlled, the amount of movement of the water caused by the ion movement from the dilution chamber to the concentration chamber can be appropriately promoted.

[4] The electrodialysis device according to still another aspect is the electrodialysis device of [3], further including:
a temperature sensor (31) that detects a temperature of the treated solution to be fed to the at least one dilution chamber (23a),
in which an opening degree of the flow regulation valve (30a) is configured to be controlled based on a detected value of the temperature sensor (31).

In general, the saturation degree of the solute has temperature dependence, and at a general temperature at which electrodialysis is performed, the higher the temperature is, the higher the saturation degree is, and the lower the temperature is, the higher the risk of scale precipitation is. In that respect, by controlling the opening degree of the flow regulation valve such that the movement of the water from the dilution chamber to the concentration chamber is promoted as the temperature of the treated solution decreases, it is possible to appropriately suppress the scale precipitation.

[5] The electrodialysis device according to still another aspect is the electrodialysis device of [3] or [4], further including:
an electric conductivity meter (32) that detects an electric conductivity of the treated solution to be fed to the at least one dilution chamber (23a),
in which an opening degree of the flow regulation valve (30a) is configured to be controlled based on a detected value of the electric conductivity meter (32).

Although the salinity concentration of seawater may vary annually in a case where the treated solution is seawater, it is known that the presence ratio of various ions does not change even in a case where the salinity concentration varies. For this reason, the higher the salinity concentration is, the higher the risk of scale precipitation is. Therefore, by understanding the variation in the salinity concentration using the electric conductivity of the treated solution and controlling the opening degree of the flow regulation valve such that the movement of the water from the dilution chamber to the concentration chamber is promoted as the electric conductivity increases, it is possible to appropriately suppress the scale precipitation.

REFERENCE SIGNS LIST

1: electrodialysis device
2: electrodialyzer stack
4: discharge line
5: circulation line
7: concentrated solution line
10: throttle member
10a: flow regulation valve
11: feed pump (treated solution feed device)
12: circulation pump (concentrated solution circulation device)
20: membrane unit
20a: membrane
20b: membrane
20c: membrane
20a1: cation exchange membrane
20b1: nanofiltration membrane
20c1: cation exchange membrane
23a: dilution chamber
24a: concentration chamber
30: throttle member
30a: flow regulation valve
31: temperature sensor
32: electric conductivity meter

The invention claimed is:
1. An electrodialysis device comprising:
an electrodialyzer stack that includes a cathode, an anode, and a membrane unit including at least three membranes provided at intervals between the cathode and the anode, the electrodialyzer stack including at least one dilution chamber and at least one concentration chamber formed between adjacent membranes,
wherein the membrane unit
includes at least two ion exchange membranes that include two ion exchange membranes which are either anion exchange membranes or cation exchange membranes and which are respectively adjacent to the cathode and the anode, and at least one nanofiltration membrane, the at least two ion exchange membranes and the at least one nanofiltration membrane being provided alternately with each other, or
includes at least two nanofiltration membranes that include two nanofiltration membranes respectively adjacent to the cathode and the anode, and at least one ion exchange membrane that is either an anion exchange membrane or a cation exchange membrane, the at least two nanofiltration membranes and the at least one ion exchange membrane being provided alternately with each other, and
the electrodialysis device further comprises:
a treated solution feed device that causes a treated solution to flow through the at least one dilution chamber to obtain a diluted liquid;
a concentrated solution circulation device for causing a concentrated solution to be concentrated to circulate through the at least one concentration chamber;

a circulation line through which the concentrated solution flows to return to the at least one concentration chamber after flowing out from the at least one concentration chamber;

a concentrated solution line for extracting a part of the concentrated solution circulating through the circulation line from the circulation line;

a discharge line through which the diluted liquid flowing out from the at least one dilution chamber flows;

at least one of a throttle member that is provided in the circulation line between a branching point where the concentrated solution line branches from the circulation line and an outlet of the at least one concentration chamber and that throttles a flow of the concentrated solution, or a throttle member that is provided in the discharge line and that throttles a flow of the diluted liquid; and a temperature sensor that detects a temperature of the treated solution to be fed to the at least one dilution chamber, wherein the at least one throttle member includes the throttle member that throttles the flow of the diluted liquid and is a flow regulation valve that regulates a flow rate of the diluted liquid flowing through the discharge line, and an opening degree of the flow regulation valve is configured to be controlled based on a detected value of the temperature sensor.

2. The electrodialysis device according to claim 1, further comprising:

an electric conductivity meter that detects an electric conductivity of the treated solution to be fed to the at least one dilution chamber, wherein an opening degree of the flow regulation valve is configured to be controlled based on a detected value of the electric conductivity meter.

* * * * *